United States Patent
Hatakeyama

(10) Patent No.: US 10,165,278 B2
(45) Date of Patent: Dec. 25, 2018

(54) IMAGE COMPRESSION DEVICE, IMAGE COMPRESSION METHOD, IMAGE EXTENSION DEVICE, AND IMAGE EXTENSION METHOD

(71) Applicant: Alpine Electronics, Inc., Tokyo (JP)

(72) Inventor: Hideyuki Hatakeyama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 203 days.

(21) Appl. No.: 15/080,243

(22) Filed: Mar. 24, 2016

(65) Prior Publication Data

US 2016/0316217 A1    Oct. 27, 2016

(30) Foreign Application Priority Data

Apr. 24, 2015    (JP) .................................. 2015-089467

(51) Int. Cl.
*H04N 19/423*    (2014.01)
*H04N 19/136*    (2014.01)
*H04N 19/593*    (2014.01)

(52) U.S. Cl.
CPC ......... *H04N 19/136* (2014.11); *H04N 19/593* (2014.11)

(58) Field of Classification Search
CPC combination set(s) only.
See application file for complete search history.

(56) References Cited

U.S. PATENT DOCUMENTS

2004/0207737 A1* 10/2004 Miyanohara ........... H04N 1/648
 348/272
2014/0037206 A1* 2/2014 Newton ............... H04N 19/597
 382/166
2016/0127734 A1* 5/2016 Nurijanyan ......... H04N 19/186
 382/166

FOREIGN PATENT DOCUMENTS

JP    2006-0331393    2/2006

* cited by examiner

*Primary Examiner* — Janese Duley
(74) *Attorney, Agent, or Firm* — Brinks Gilson & Lione

(57) ABSTRACT

An image compression device includes a basic unit setting unit configured to set a basic unit of compression by using each of a plurality of color elements forming colors of pixels of image data independently or combining the plurality of color elements arbitrarily and a compression process unit configured to compress a value of the set basic unit according to an encoding process base on a predetermined rule. A complex process is not executed differently from a video codec or a still image codec according to the related art and the compression is performed by a simple process for encoding values of basic units set for the plurality of color elements forming the colors of the individual pixels, on the basis of the predetermined rule. As a result, a process load of the extension can be reduced as compared with the related art.

11 Claims, 10 Drawing Sheets

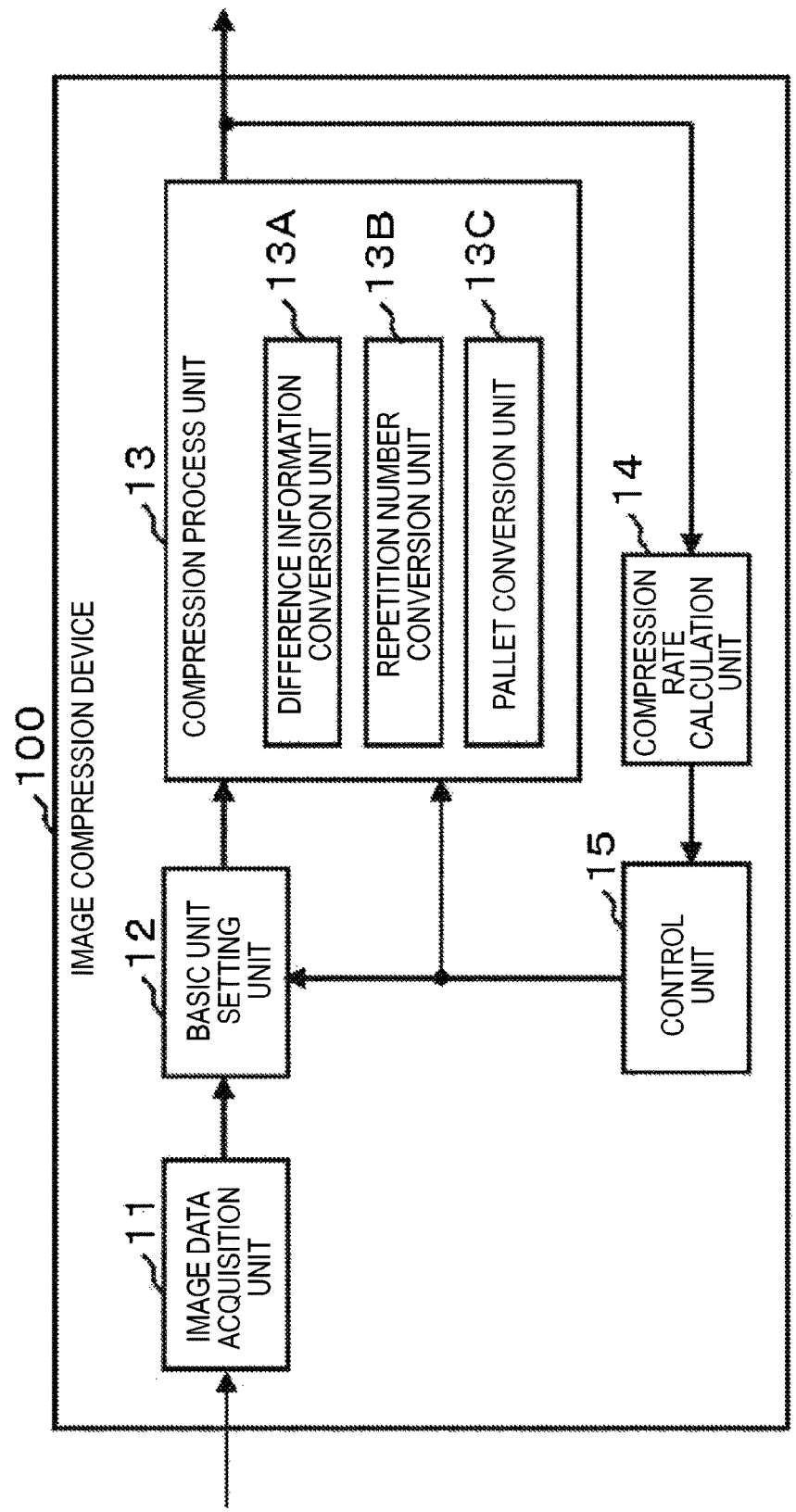

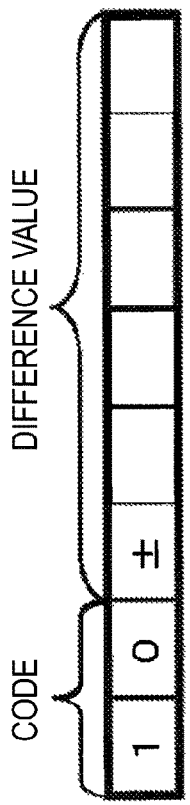 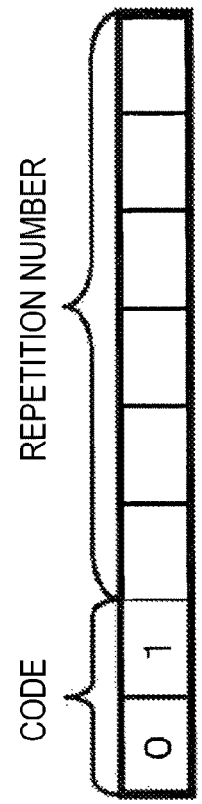 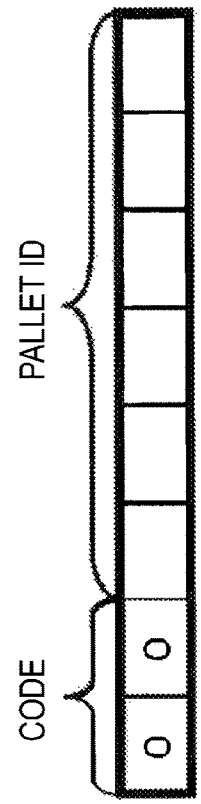 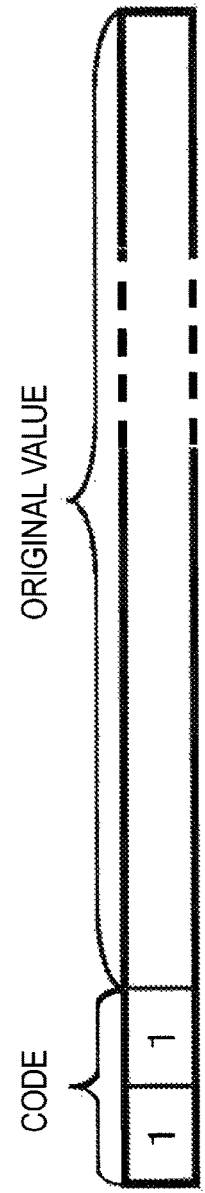
FIG. 2A DIFFERENCE INFORMATION
FIG. 2B REPETITION NUMBER
FIG. 2C PALLET
FIG. 2D NON-COMPRESSION

IMAGE COMPRESSION DEVICE, IMAGE COMPRESSION METHOD, IMAGE EXTENSION DEVICE, AND IMAGE EXTENSION METHOD

RELATED APPLICATIONS

The present application claims priority to Japanese Patent Application Serial Number 2015-089467, filed Apr. 24, 2015, the entirety of which is hereby incorporated by reference.

BACKGROUND

1. Field of the Invention

The present disclosure relates to an image compression device, an image compression method, an image extension device, and an image extension method and more particularly, to an image compression device, an image compression method, an image extension device, and an image extension method that are suitable for compression/extension of an image in which a change of pixel values with adjacent pixels is relatively small.

2. Description of the Related Art

Generally, because moving image data has a large capacity, a data amount is generally reduced using compression technology to reduce communication traffic in data transfer or a storage capacity necessary for data storage. Particularly, the data amount of the moving image data tends to become extremely large. For this reason, most of video codecs adopt an algorithm of lossy compression having a compression rate larger than a compression rate of lossless compression.

Technology for converting image data in a data format of YCbCr and compressing YCbCr data by an MPEG encoder or a Motion-JPEG encoder is also suggested (for example, refer to JP 2006-33193 A).

An extension process needs to be executed on compressed data before the compressed data is used. In compression of the moving image data, a compression rate is an important element and reproducibility (quality of a reproduction image) of an original image is also an important element. In addition, it is necessary to consider reduction of a load of the extension process for smooth reproduction. That is, in compression of a moving image, it is determined what kind of algorithmic codec is adopted, in consideration of a trade-off of various factors such as a compression rate, an image quality, and a process load of compression/extension.

For example, in the case of a moving image (hereinafter, referred to as an opening movie) reproduced when a power supply of an electronic apparatus is turned on and the electronic apparatus starts, a codec in which the process load of the extension is small is demanded in consideration of an influence on a start time. For this reason, a plurality of still image data is compressed using a still image codec, not a video codec such as MPEG, the still image data is stored, the still image compression data is sequentially extended at the time of the start, and the still image data is reproduced like a flip book.

The JPEG of the lossy compression often used in the still image codec executes processes such as discrete cosine transform (DCT), quantization, and Huffman encoding. In addition, portable network graphics (PNG) of the lossless compression can convert five kinds of filters (differences with top/left/right and an average) for each horizontal line and performs compression after filtering to improve a compression rate.

However, even in any codec, an operation amount necessary for the extension process increases. For this reason, if the codec according to the related art is applied to the opening movie, a time necessary for a start process of the electronic apparatus executed in parallel with reproduction of the opening movie may increase.

Accordingly, the present disclosure has been made to address the above problem and an object of the present invention is to provide a codec in which a process load of extension is smaller.

SUMMARY

To address the above problem, in an image compression device according to an aspect of the present disclosure, a basic unit of compression is set by using each of a plurality of color elements forming colors of pixels of image data independently or combining the plurality of color elements arbitrarily and a value of the set basic unit is compressed according to an encoding process based on a predetermined rule.

In addition, in an image extension device according to another aspect of the present disclosure, an inverse process of the encoding process based on the predetermined rule is executed on the compression data generated by the image compression device, thereby decoding the value of the basic unit, and values of the pixels configured from the plurality of color elements are reproduced using the decoded value of the basic unit.

According to forms of the present disclosure, a complex process is not executed differently from a video codec or a still image codec according to the related art and compression is performed by a simple process for encoding values of basic units set for a plurality of color elements forming colors of individual pixels, on the basis of a predetermined rule. As a result, extension executed by an inverse process of a compression process also becomes a simple process and a process load of the extension can be reduced as compared with the related art.

BRIEF DESCRIPTION OF THE DRAWINGS

FIG. 1 is a block diagram illustrating a functional configuration example of an image compression device;

FIGS. 2A to 2D are diagrams illustrating configuration examples of compression data generated by first to third encoding processes;

DETAILED DESCRIPTION OF THE DRAWINGS

Figure 3:
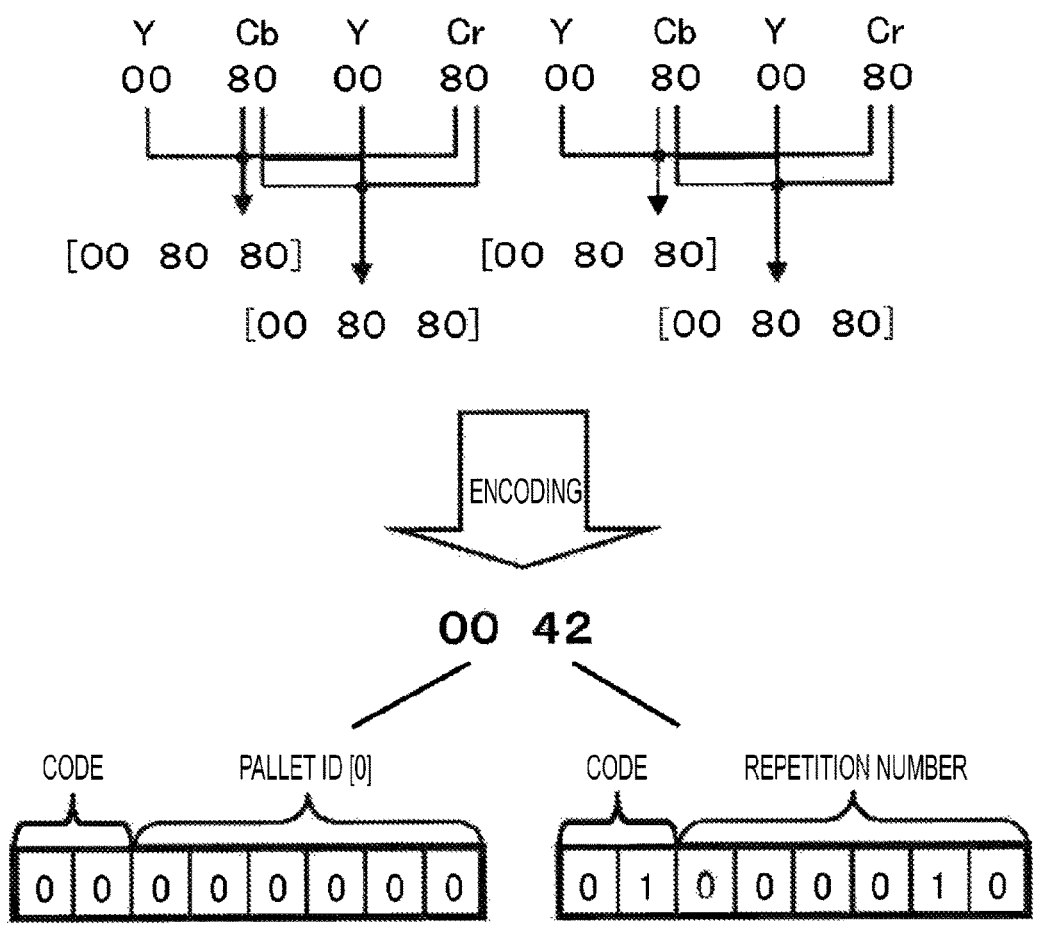
FIG. 3 is a diagram illustrating an example of a specific compression process executed by a compression process unit.

Hereinafter, an embodiment of the present disclosure will be described on the basis of the drawings. FIG. 1 is a block diagram illustrating a functional configuration example of an image compression device. As illustrated in FIG. 1, an image compression device 100 includes an image data acquisition unit 11, a basic unit setting unit 12, a compression process unit 13, a compression rate calculation unit 14, and a control unit 15 as a functional configuration thereof. The compression process unit 13 includes a difference information conversion unit 13A, a repetition number of times conversion unit 13B, and a palette conversion unit 13C as a specific functional configuration.

Each of the functional blocks 11 to 15 can be configured from any one of hardware, a digital signal processor (DSP), and software. For example, when each of the functional blocks 11 to 15 is configured from the software, each of the functional blocks 11 to 15 includes a CPU, a RAM, and a ROM of a computer in actuality and is realized by operating a program stored in a recording medium such as the RAM, the ROM, a hard disk, and a semiconductor memory.

The image data acquisition unit 11 acquires image data to be compressed. For example, the image data acquisition unit 11 acquires image data used as an opening movie of an electronic apparatus. In this embodiment, YCbCr is used as an example of a color space of a codec. That is, the image data acquisition unit 11 acquires image data in which one pixel includes three color elements of Y, Cb, and Cr. Also, image data in which one pixel includes three color elements of R, G, and B may be acquired by the image data acquisition unit 11 and the image data may be converted into image data of YCbCr.

The basic unit setting unit 12 sets basic units of the compression by using each of a plurality of color elements forming colors of pixels of the image data acquired by the image data acquisition unit 11 independently or combining the plurality of color elements arbitrarily. For example, the basic unit setting unit 12 sets the basic units of the compression by using each of Y, Cb, and Cr independently. In this case, the basic units of the compression are three kinds.

Alternatively, the basic unit setting unit 12 sets Y and a combination of CbCr as the basic units of the compression, respectively. In this case, the basic units of the compression are two kinds. In addition, a combination of YCb and Cr may be set as the basic units, respectively. In addition, a combination of YCb and a combination of YCr may be set as the basic units, respectively. Even in any case, the basic units of the compression are two kinds. In addition, the basic unit setting unit 12 can set the basic unit of the compression by any combination.

The compression process unit 13 compresses values of the basic units set by the basic unit setting unit 12, according to an encoding process based on a predetermined rule. For example, when the basic units of the compression are set by the basic unit setting unit 12 using each of Y, Cb, and Cr independently, the compression process unit 13 compresses a pixel value of each of Y, Cb, and Cr, according to the encoding process based on the predetermined rule. In addition, when Y and the combination of CbCr are set as the basic units of the compression by the basic unit setting unit 12, the compression process unit 13 compresses the pixel value of Y and a combination value obtained by combining the pixel value of Cb and the pixel value of Cr, according to the encoding process based on the predetermined rule.

In this embodiment, as an example, for image data in which a value of one color element is represented by 16 bits (two bytes), a value of the basic unit is compressed into a value of 8 bits (one byte) by the encoding process. For example, when the compression is performed using each of Y, Cb, and Cr as the basic unit, the compression process unit 13 compresses a value of two bytes of each of Y, Cb, and Cr into a value of one byte of each of Y, Cb, and Cr. In addition, when the compression is performed using each of Y and CbCr as the basic unit, the compression process unit 13 compresses a value of two bytes of Y into a value of one byte of Y and compresses a value of four bytes of CbCr into a value of one byte of CbCr.

In this embodiment, three kinds of rules are prepared as the predetermined rule for the encoding process. The difference information conversion unit 13A, the repetition number of times conversion unit 13B, and the palette conversion unit 13C execute the encoding process according to the three kinds of rules. The difference information conversion unit 13A executes a process (first encoding process) for converting a value of a target pixel regarding the basic unit into difference information with a value of an immediately previous pixel. Here, the difference information conversion unit 13A detects difference information between immediately previous pixels, instead of detecting difference information between general frames by a compression codec according to the related art. As a result, a capacity of a buffer used to detect the difference information can be decreased.

For example, it is assumed that a value of a basic unit in a certain pixel is "05h" ("0000000000000101" when represented by a bit string) and a value of a basic unit in an immediately previous pixel is "04h" ("0000000000000100" when represented by a bit string). In this case, the difference information conversion unit 13A converts the value "05h" of the basic unit of two bytes into difference information showing "+1" of one byte. In the opening movie, instead of an image having a rapid color change, an image gradually changing like gradation is often used. For this reason, a difference of pixel values between adjacent pixels becomes relatively small. Therefore, the value of the two bytes can be converted into the difference information of one byte.

The repetition number of times conversion unit 13B executes a process (second encoding process) for, when a plurality of pixels having values equal to the value of the immediately previous pixel for the basic unit are continuous, converting the values of the plurality of pixels into repetition number of times information. For example, it is assumed that the value "05h" of the basic unit is the same in five pixels including the certain pixel (05h, 05h, 05h, 05h, and 05h). In this case, the repetition number of times conversion unit 13B converts the values "05h" of the four basic units of the second to fifth pixels into one repetition number of times information showing a repetition number of times of 4. In this case, values of a total of eight bytes in the four pixels can be converted into repetition number of times information of one byte. Therefore, if the repetition number of times of the same value increases, a compression rate increases.

The palette conversion unit 13C executes a process (third encoding process) for, when a combination of values of basic units corresponds to a combination previously set as a palette, converting the combination of the values of the basic units into palette identification information. For example, when a combination "00h, 80h, and 80h" of values of three basic units of Y, Cb, and Cr is defined as one palette, the palette conversion unit 13C can convert values of a total of six bytes into palette identification information of one byte. In this embodiment, because an encoded value is represented by one byte, palettes of the number that can be identified by one byte can be set previously.

Here, the example of the case in which the combination of the values of the three basic units is defined as one palette has been described. However, a combination of values of two or four or more basic units may be defined as one palette. If a combination number of the basic units increases and the palette is defined, a compression rate when the combination of the values of the basic units is converted into the palette identification information can be increased. However, because the values of the same combination as the palette are less likely to be included in original image data, the frequency of the combination being converted into the palette identification information decreases conversely. Therefore, content of the previously set palette is determined in consideration of a relation of an antinomy.

FIGS. 2A to 2D are diagrams illustrating configuration examples of compression data generated by the first to third encoding processes by the difference information conversion unit 13A, the repetition number of times conversion unit 13B, and the palette conversion unit 13C. FIG. 2A illustrates a configuration example of difference information generated by the difference information conversion unit 13A. Two bits starting from a most significant bit (MSB) in difference information of one byte is code information "10b" showing the difference information. A third bit is information showing a sign of ±(+ is shown by "0" and − is shown by "1"). The remaining five bits are information showing a difference value. Therefore, difference information of "+1" in the above example is represented by "10000001"="81h".

FIG. 2B illustrates a configuration example of repetition number of times information generated by the repetition number of times conversion unit 13B. Two bits starting from an MSB in repetition number of times information of one byte is code information "01b" showing the repetition number-of-time information. The remaining six bits are information showing a value of the repetition number of times. Therefore, repetition number of times information showing the repetition number of times of 4 in the above example is represented by "01000011"="43h" (because the repetition number of times of 1 is represented by "0000", the repetition number of times of 4 is represented by "0011").

FIG. 2C illustrates a configuration example of palette identification information generated by the palette conversion unit 13C. Two bits starting from an MSB in palette identification information of one byte are code information "00b" showing the palette identification information. The remaining six bits are information (hereinafter, referred to as the palette ID) to identify each palette. For example, when a palette ID of a palette configured from the combination of the values of the three basic units of "00h, 80h, and 80h" described above is defined as "0", palette identification information is represented by "00000000"="00h".

When the values of the basic units are converted into none of the difference information, the repetition number of times information, and the palette identification information, the code information is set as "11b" and the values of the basic units are arranged successively after the code information, as illustrated in FIG. 2D.

As described above, the compression process unit 13 selects an appropriate encoding process from the first encoding process by the difference information conversion unit 13A, the second encoding process by the repetition number of times conversion unit 13B, and the third encoding process by the palette conversion unit 13C and sequentially executes the encoding process on the image data acquired by the image data acquisition unit 11, for each basic unit set by the basic unit setting unit 12, and generates compression data obtained by adding code information showing the selected encoding process.

Figure 4:
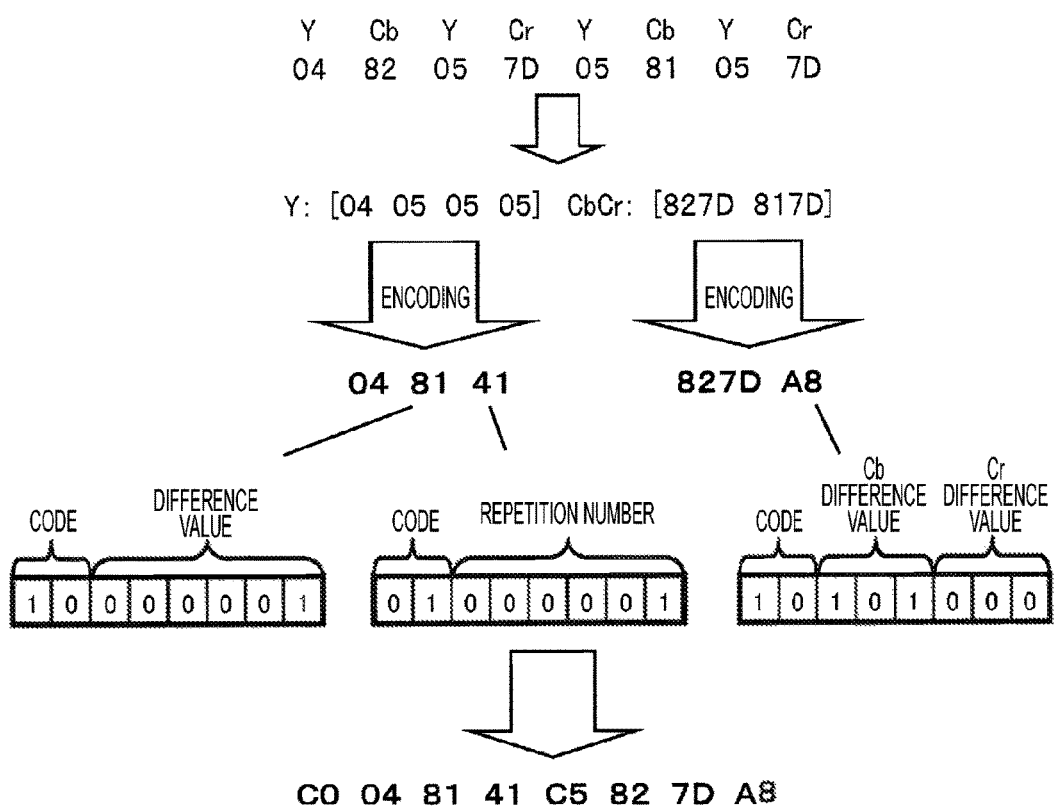
FIG. 4 is a diagram illustrating an example of the specific compression process executed by the compression process unit.

FIGS. 3 and 4 are diagrams illustrating examples of a specific compression process executed by the compression process unit 13. FIG. 3 illustrates an example of the case in which the basic unit setting unit 12 sets each of Y, Cb, and Cr as a basic unit of the compression and the compression process unit 13 applies any one of the first to third encoding processes and compresses a value of each of Y, Cb, and Cr. Here, it is assumed that image data has a data format of YCbCr 4:2:2, for example.

In the example of FIG. 3, a value of the image data acquired by the image data acquisition unit 11 is shown by "00h, 80h, 00h, 80h, 00h, 80h, 00h, and 80h". When the data format of the image data is YCbCr 4:2:2, values of Y, Cb, and Cr of a first pixel become "00h, 80h, and 80h", values of Y, Cb, and Cr of a second pixel also become "00h, 80h, and 80h", values of Y, Cb, and Cr of a third pixel also become "00h, 80h, and 80h", and values of Y, Cb, and Cr of a fourth pixel also become "00h, 80h, and 80h".

In this case, a combination "00h, 80h, and 80h" of the values of the three basic units of Y, Cb, and Cr corresponds to a palette having a palette ID "0" and this is continuous over the four pixels. Therefore, for the first pixel, the compression process unit 13 applies the third encoding process by the palette conversion unit 13C and converts values of "00h, 80h, and 80h" of six bytes into palette identification information "00h" of one byte. In addition, for the second to fourth pixels, the compression process unit 13 applies the second encoding process by the repetition number of times conversion unit 13B and converts values of a total of 18 bytes into repetition number of times information "42h" of one byte.

Next, in the example of FIG. 4, a value of the image data acquired by the image data acquisition unit 11 is shown by "04h, 82h, 05h, 7Dh, 05h, 81h, 05h, and 7Dh". FIG. 4 illustrates an example of the case in which the basic unit setting unit 12 sets each of Y and CbCr as the basic unit of the compression and the compression process unit 13 applies any one of the first to third encoding processes and compresses a value of each of Y and CbCr.

When the data format of the image data is YCbCr 4:2:2, values of the basic units of Y are represented by a sequence "04h, 05h, 05h, and 05h" and values of the basic units of CbCr are represented by a sequence "827Dh and 817Dh". In this case, because the first value cannot be compressed for the basic units of Y, the first value is set as "04h" of two bytes without conversion. For the second value, the first encoding process by the difference information conversion unit 13A is applied and a value of "05h" of two bytes is converted into difference information "81h" of one byte. In addition, for the third and fourth values, the second encoding process by the repetition number of times conversion unit 13B is applied and values of a total of four bytes are converted into repetition number of times information "41h" of one byte.

Meanwhile, because the first value cannot be compressed for the basic unit of CbCr, the first value is set as "827Dh" of four bytes without conversion. For the second value, the first encoding process by the difference information conversion unit 13A is applied and a value of "817Dh" of four bytes is converted into difference information "A8h" of one byte. A value "10b" of two bits starting from an MSB in eight bits configuring data of "A8h" is code information showing difference information. A value "101b" of the following three bits is a difference value for Cb and one bit of a head shows a sign of ±. In addition, a value "000b" of the remaining three bits is a difference value for Cr and one bit of a head shows a sign of ±.

As in the example of FIG. 4, when the plurality of color elements are combined and the basic units of the compression are set, it is necessary to enable identification of a combination in which the basic units are set. Therefore, code information showing a kind of the basic unit is added and compression data is configured. In the example of FIG. 4, code information showing the basic unit of Y is set as "C0h", code information showing the basic unit of CbCr is set as "C5h", and a value encoded for each basic unit is arranged successively after each code information, so that compression data is configured.

That is, a value of the compression data obtained by the compression process unit 13 is "C0h, 04h, 81h, 41h, C5h, 82h, 7Dh, and A8h", "04h, 81h, and 41h" arranged successively after "C0h" shows compression data regarding the basic unit of Y, and "82h, 7Dh, and A8h" arranged successively after "C5h" shows compression data regarding the basic unit of CbCr.

The compression rate calculation unit 14 calculates a compression rate for the image data compressed by the compression process unit 13.

The control unit 15 controls operations of the basic unit setting unit 12 and the compression process unit 13. For example, the control unit 15 executes a basic unit adoption process for setting a plurality of kinds of basic units by the basic unit setting unit 12, executing an encoding process by the compression process unit 13 under setting of the plurality of kinds of basic units, and adopting a basic unit when a compression rate becomes highest and executes control such that image data is compressed using the adopted basic unit.

Here, the control unit 15 may execute the basic unit adoption process for each frame of the image data, adopt the basic unit when the compression rate becomes highest, for each frame, and compress the image data. Alternatively, the control unit 15 may execute the basic unit adoption process for each line of the image data or each block of a rectangular shape including pixels of a predetermined number, adopt the basic unit when the compression rate becomes highest, for each line or each block, and compress the image data.

In addition, the control unit 15 may execute both a process for executing the basic unit adoption process for each frame of the image data, adopting the basic unit when the compression rate becomes highest, for each frame, and compressing the image data and a process for executing the basic unit adoption process for each line of the image data or each block, adopting the basic unit when the compression rate becomes highest, for each line or each block, and compressing the image data, adopt the process in which the compression rate becomes higher, and compress the image data.

Figure 5:
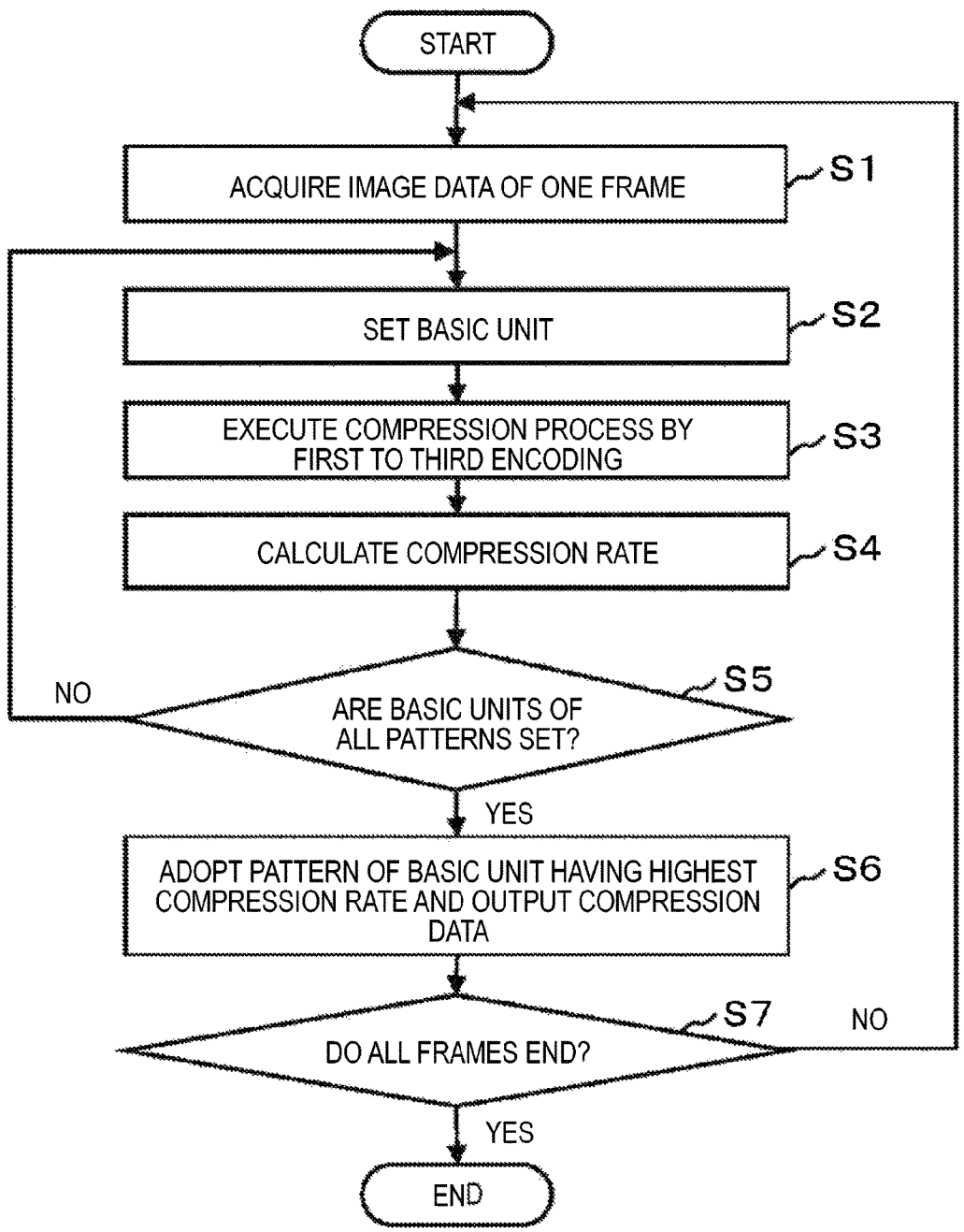
FIG. 5 is a flowchart illustrating a first operation example of the image compression device.

FIG. 5 is a flowchart illustrating a first operation example of the image compression device 100 configured as described above. The flowchart illustrated in FIG. 5 starts when image data to be compressed is designated and starting of a compression process is commanded. The flowchart of FIG. 5 illustrates an operation example of the case in which the basic unit when the compression rate becomes highest is adopted for each frame and the image data is compressed.

First, the image data acquisition unit 11 acquires image data of one frame in image data to be compressed (step S1). Next, the basic unit setting unit 12 sets basic units of the compression, for a plurality of color elements forming colors of pixels of the image data acquired by the image data acquisition unit 11 (step S2). Here, a basic unit of any pattern among basic units of a plurality of patterns prepared is set.

Next, the compression process unit 13 compresses values of the basic units set by the basic unit setting unit 12, according to the first to third encoding processes (step S3). That is, the compression process unit 13 selects an appropriate encoding process from the first encoding process by the difference information conversion unit 13A, the second encoding process by the repetition number of times conversion unit 13B, and the third encoding process by the palette conversion unit 13C and sequentially executes the encoding process, for each basic unit set by the basic unit setting unit 12, and compresses the image data of one frame.

If compression of the image data of one frame ends, the compression rate calculation unit 14 calculates a compression rate of the compressed image data (step S4). Here, the calculated compression rate is temporarily stored for comparison thereafter. Then, the basic unit setting unit 12 determines whether all of the basic units of the plurality of patterns prepared are set and the data compression is performed (step S5). When the pattern of the basic unit not set exists, the process returns to step S2, a basic unit of a different pattern is set, and the processes of steps S3 to S4 are executed again under the newly set basic unit.

Meanwhile, in step S5, when it is determined by the basic unit setting unit 12 that all of the basic units of the plurality of patterns prepared are set, the control unit 15 compares the compression rates calculated for each of the patterns, adopts the basic unit of the pattern in which the compression rate becomes highest, and executes control such image data compressed under the basic unit is output from the compression process unit 13 (step S6).

Then, the image data acquisition unit 11 determines whether all frames of the image data to be compressed are acquired (step S7). Here, when a non-processed frame is left, the process returns to step S1 and the image data acquisition unit 11 acquires image data of a following frame. In addition, the processes of steps S2 to S6 are executed again. Meanwhile, when the image data acquisition unit 11 acquires the image data of all of the frames, the process of the flowchart illustrated in FIG. 5 ends.

Figure 6:
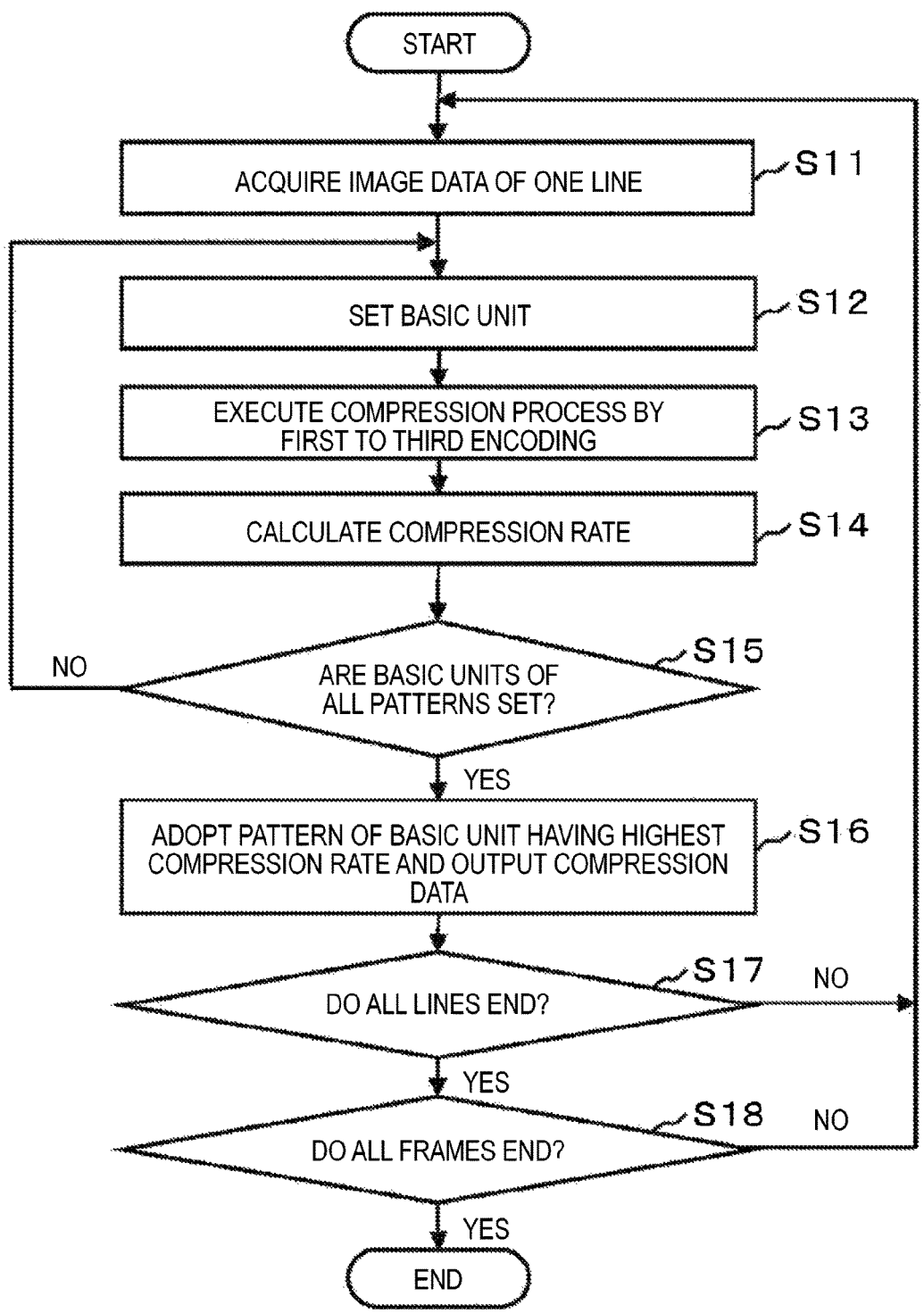
FIG. 6 is a flowchart illustrating a second operation example of the image compression device.

FIG. 6 is a flowchart illustrating a second operation example of the image compression device 100. The flowchart illustrated in FIG. 6 starts when image data to be compressed is designated and starting of a compression process is commanded. The flowchart of FIG. 6 illustrates an operation example of the case in which a basic unit when a compression rate becomes highest is adopted for each line and image data is compressed.

First, the image data acquisition unit 11 acquires data of one line in one frame of image data to be compressed (step S11). Next, the basic unit setting unit 12 sets basic units of the compression, for a plurality of color elements forming colors of pixels of the image data acquired by the image data acquisition unit 11 (step S12). Here, a basic unit of any pattern among basic units of a plurality of patterns prepared is set.

Next, the compression process unit 13 compresses values of the basic units set by the basic unit setting unit 12, according to the first to third encoding processes (step S13). That is, the compression process unit 13 selects an appropriate encoding process from the first encoding process by the difference information conversion unit 13A, the second encoding process by the repetition number of times conversion unit 13B, and the third encoding process by the palette conversion unit 13C and sequentially executes the encoding process, for each basic unit set by the basic unit setting unit 12, and compresses the image data of one line.

If compression of the image data of one line ends, the compression rate calculation unit 14 calculates a compression rate of the compressed image data (step S14). Here, the calculated compression rate is temporarily stored for comparison thereafter. Then, the basic unit setting unit 12 determines whether all of the basic units of the plurality of patterns prepared are set and the data compression is performed (step S15). When the pattern of the basic unit not set exists, the process returns to step S12, a basic unit of a different pattern is set, and the processes of steps S13 to S14 are executed again under the newly set basic unit.

Meanwhile, in step S15, when it is determined by the basic unit setting unit 12 that all of the basic units of the plurality of patterns prepared are set, the control unit 15 compares the compression rates calculated for each of the patterns, adopts the basic unit of the pattern in which the compression rate becomes highest, and executes control such image data compressed under the basic unit is output from the compression process unit 13 (step S16).

Then, the image data acquisition unit 11 determines whether image data of all lines in one frame is acquired (step S17). Here, when a non-processed line is left, the process returns to step S11 and the image data acquisition unit 11 acquires image data of a following line. In addition, the processes of steps S12 to S16 are executed again.

Meanwhile, when the image data acquisition unit 11 acquires the image data of all of the lines in one frame, the image data acquisition unit 11 determines whether all frames of the image data to be compressed are acquired (step S18). Here, when a non-processed frame is left, the process returns to step S11 and the image data acquisition unit 11 acquires image data of one line of a following frame. In addition, the processes of steps S12 to S17 are executed again. Meanwhile, when the image data acquisition unit 11 acquires image data of all frames, the process of the flowchart illustrated in FIG. 6 ends.

Figure 7:
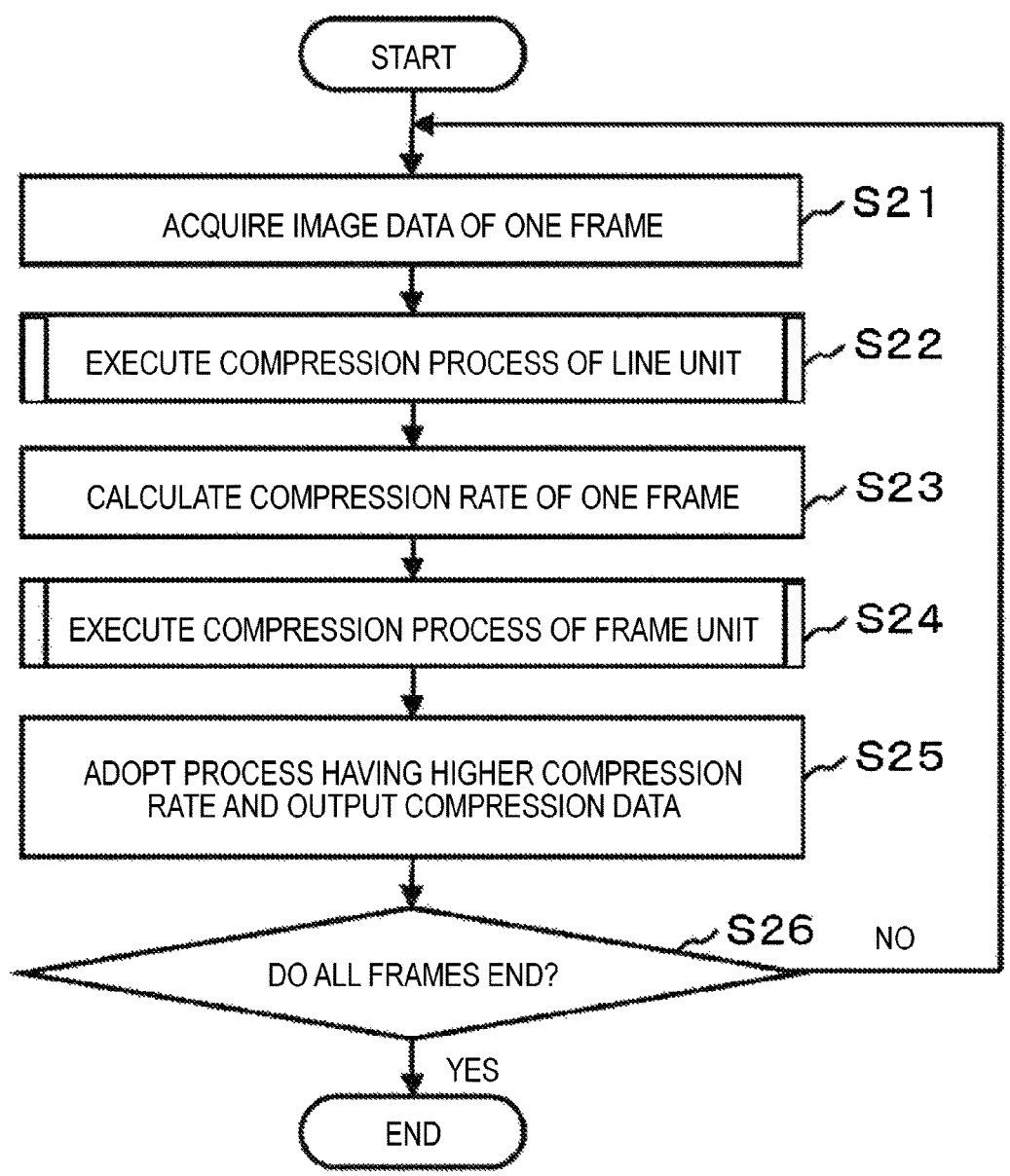
FIG. 7 is a flowchart illustrating a third operation example of the image compression device.

FIG. 7 is a flowchart illustrating a third operation example of the image compression device 100. The flowchart illustrated in FIG. 7 starts when image data to be compressed is designated and starting of a compression process is commanded. The flowchart of FIG. 7 illustrates an operation example of the case in which both a process for adopting a basic unit when a compression rate becomes highest for each frame and compressing the image data and a process for adopting the basic unit in which the compression rate becomes highest for each line and compressing the image data are executed and the process in which the compression rate is higher is adopted.

First, the image data acquisition unit 11 acquires image data of one frame in the image data to be compressed (step S21). Next, the basic unit setting unit 12 and the compression process unit 13 execute a compression process of a line unit, under control by the control unit 15 (step S22). The compression process of the line unit corresponds to the processes illustrated in steps S11 to S17 of FIG. 6.

If data compression of one frame by the compression process of the line unit ends, the compression rate calculation unit 14 calculates a compression rate of the compressed image data of one frame (step S23). Here, the calculated compression rate is temporarily stored for comparison thereafter.

Then, the basic unit setting unit 12 and the compression process unit 13 execute a compression process of a frame unit, under the control by the control unit 15 (step S24). The compression process of the frame unit corresponds to the processes illustrated in steps S1 to S6 of FIG. 5.

If the data compression of the frame unit ends, the control unit 15 compares the compression rate calculated by the process of step S23 when the compression process is executed in the line unit and the compression rate calculated by the process of step S24 when the compression process is executed in the frame unit, adopts the process in which the compression rate becomes higher, and executes control such that the image data compressed under the process is output from the compression process unit 13 (step S25).

Then, the image data acquisition unit 11 determines whether all frames of the image data to be compressed are acquired (step S26). Here, when a non-processed frame is left, the process returns to step S21 and the image data acquisition unit 11 acquires image data of a following frame. In addition, the processes of steps S22 to S25 are executed again. Meanwhile, when the image data acquisition unit 11 acquires the image data of all of the frames, the process of the flowchart illustrated in FIG. 7 ends.

The image data (compression data) of the opening movie compressed by the image compression device 100 as described above is stored in a memory embedded in an electronic apparatus using the opening movie. In the case in which the opening movie is acquired from an external server device when a power supply of the electronic apparatus starts and is displayed, the compression data is stored in the server device.

Figure 8:
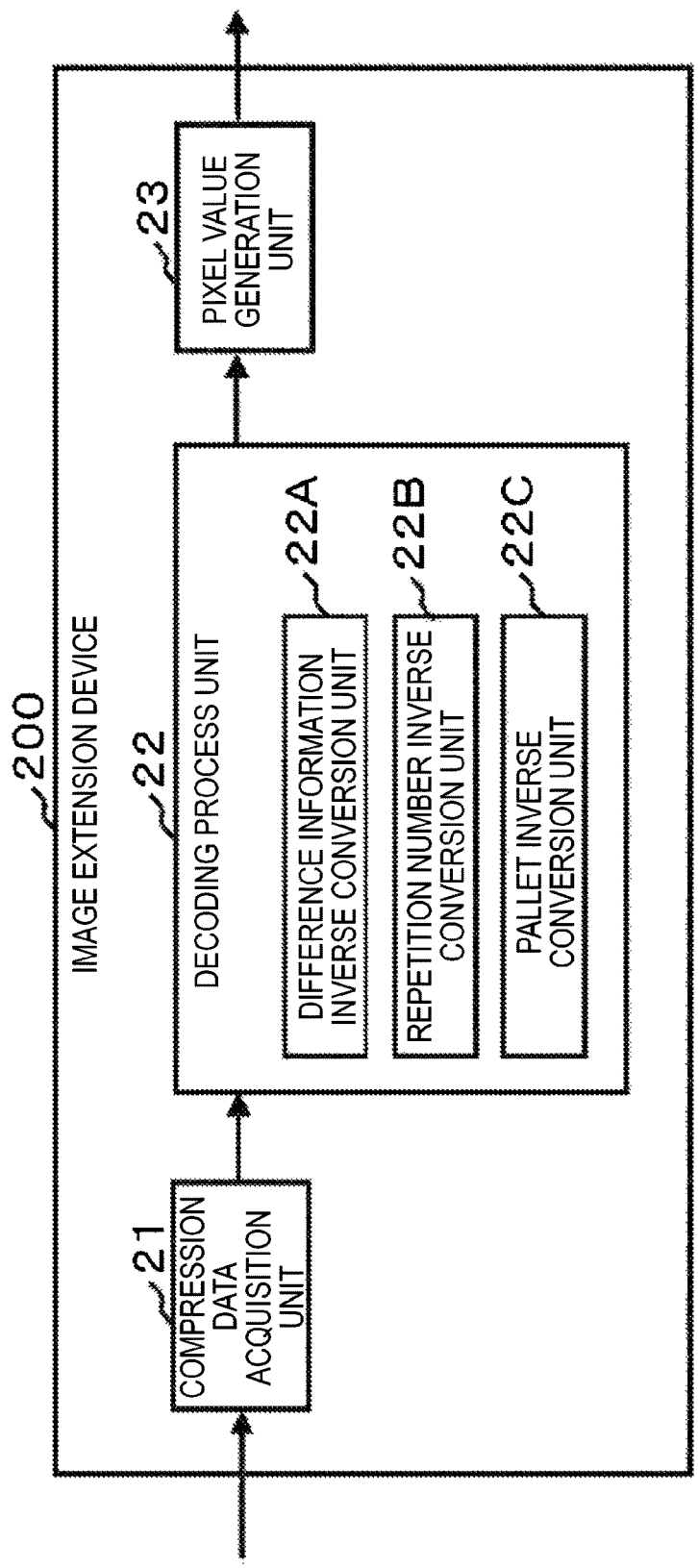
FIG. 8 is a block diagram illustrating a functional configuration example of an image extension device.

FIG. 8 is a block diagram illustrating a functional configuration example of an image extension device. The image extension device is mounted on the electronic apparatus configured to display the opening movie when the power supply starts. As illustrated in FIG. 8, an image extension device 200 includes a compression data acquisition unit 21, a decoding process unit 22, and a pixel value generation unit 23 as a functional configuration thereof. The decoding process unit 22 includes a difference information inverse conversion unit 22A, a repetition number of times inverse conversion unit 22B, and a palette inverse conversion unit 22C as a specific functional configuration.

The individual functional blocks 21 to 23 can be configured from any one of hardware, a DSP, and software. For example, when each of the functional blocks 21 to 23 is configured from the software, each of the functional blocks 21 to 23 includes a CPU, a RAM, and a ROM of a computer in actuality and is realized by operating a program stored in a recording medium such as a RAM, a ROM, a hard disk, and a semiconductor memory.

The compression data acquisition unit 21 acquires image data compressed by the image compression device 100. Specifically, the compression data acquisition unit 21 acquires the compression data previously stored in the memory embedded in the electronic apparatus or the external server device, when the power supply of the electronic apparatus is turned on.

The decoding process unit 22 executes an inverse process of the encoding process by the compression process unit 13 on the compression data acquired by the compression data acquisition unit 21 and decodes values of the basic units. At this time, the decoding process unit 22 selectively executes the process of any one of the difference information inverse conversion unit 22A, the repetition number of times inverse conversion unit 22B, and the palette inverse conversion unit 22C while confirming a pattern of the basic units set to the compression data and a kind of the encoding process to be executed (which of the first to third encoding processes is executed), on the basis of code information included in the compression data, and decodes the values of the basic units set to the compression data.

Here, the difference information inverse conversion unit 22A executes an inverse process of the first encoding process by the difference information conversion unit 13A and decodes the difference information into the values of the original basic units. The repetition number of times inverse conversion unit 22B executes an inverse process of the second encoding process by the repetition number of times conversion unit 13B and decodes the repetition number of times information into the values of the original basic units. In addition, the palette inverse conversion unit 22C executes an inverse process of the third encoding process by the palette conversion unit 13C and decodes the palette identification information into the values of the original basic units.

The pixel value generation unit 23 reproduces the values of the pixels configured from the plurality of color elements, using the values of the basic units decoded by the decoding process unit 22. The value of each pixel is generated by the pixel value generation unit 23, so that the original image data is reproduced. In addition, the reproduced image data is displayed as the opening movie on a screen by a display control unit (not illustrated in the drawings) of the electronic apparatus.

Figure 9:
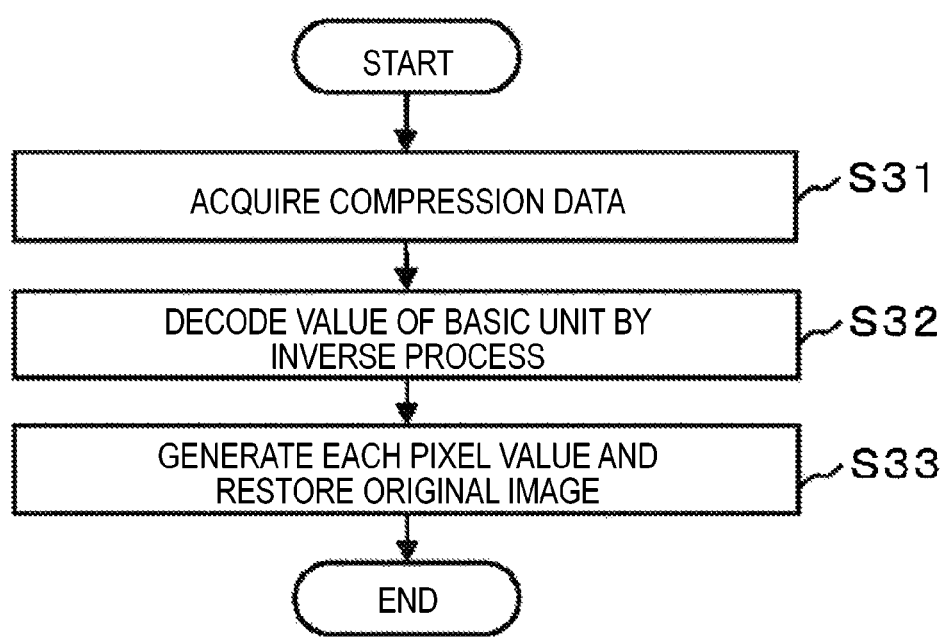
FIG. 9 is a flowchart illustrating an operation example of the image extension device.

FIG. 9 is a flowchart illustrating an operation example of the image extension device 200. The flowchart illustrated in FIG. 9 starts when the power supply of the electronic apparatus on which the image extension device 200 is mounted is turned on.

First, the compression data acquisition unit 21 acquires the compression data previously stored in the memory embedded in the electronic apparatus or the external server device (step S31). Next, the decoding process unit 22 executes the inverse process of the encoding process by the compression process unit 13 on the compression data acquired by the compression data acquisition unit 21 and decodes the values of the basic units (step S32).

In addition, the pixel value generation unit 23 generates the values of the pixels configured from the plurality of color elements, using the values of the basic units decoded by the decoding process unit 22, and reproduces the original image data before the compression (step S33). Then, the process of the flowchart illustrated in FIG. 9 ends.

As described in detail above, in the image compression device 100 the basic units of the compression are set by using each of the plurality of color elements forming the colors of the pixels of the image data independently or combining the plurality of color elements arbitrarily and the values of the set basic units are compressed according to the first to third encoding processes.

In addition, in the image extension device 200 according to this embodiment, the inverse processes of the first to third encoding processes are executed on the compression data generated by the image compression device 100, the values of the basic units are decoded, and the values of the pixels configured from the plurality of color elements are reproduced using the decoded values of the basic units.

In forms of the present disclosure as described above, the complex process is not executed differently from the video codec or the still image codec according to the related art and the compression is performed by a simple process for encoding the values of the basic units set for the plurality of color elements forming the colors of the individual pixels, on the basis of the predetermined rule. As a result, the extension executed by the inverse process of the process of the compression also becomes a simple process and a process load of the extension can be reduced as compared with the related art.

In forms of the present disclosure, when the two color elements are combined and the basic units of the compression are set, for the difference information of one byte generated by the difference information conversion unit 13A, it is necessary to represent the difference value of Cb and the difference value of Cr by the six bits obtained by excluding the two bits starting from the MSB from the difference information of the eight bits. For this reason, each allocation becomes three bits and if the sign of ± is excluded, each allocation becomes only two bits (refer to FIG. 4). Therefore, the value that can be represented as the difference value is only in a range of ±0 to 3. For this reason, when the difference value is beyond the range of ±0 to 3, the first encoding process by the difference information conversion unit 13A cannot be applied.

Figure 10:
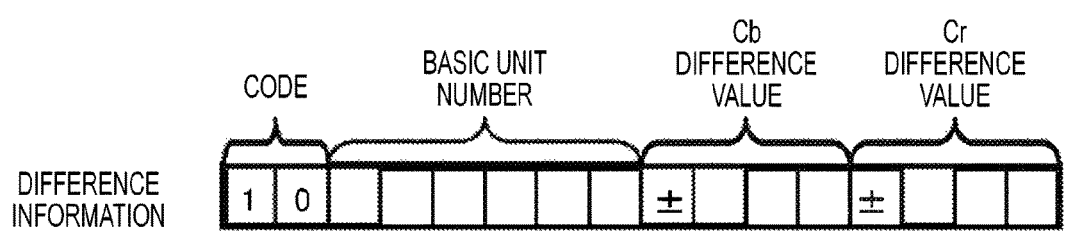
FIG. 10 is a diagram illustrating another configuration example of the compression data reproduced by the image compression device.

Meanwhile, the allocation bit number of the difference value for one color element may be increased by representing the difference information generated by the difference information conversion unit 13A by two bytes. For example, as illustrated in FIG. 10, code information "10b" showing the difference information and a combination number of color elements are represented in a first byte of data of the two bytes configuring the difference information and a difference value of Cb and a difference value of Cr are represented in the following byte. In this way, the allocation bit number of the difference value of each color element can be set as four bits and difference values of ±0 to 7 can be represented.

In this case, because values of a total of four bytes in CbCr are compressed into the difference information of the two bytes, the compression rate when the first encoding process by the difference information conversion unit 13A is applied once decreases as compared with the embodiment. However, because the number of times of applying the first encoding process by the difference information conversion unit 13A increases, a compression rate of the entire image data can be increased.

In addition, in the embodiment, the case in which the value of each color element forming the image data before the compression is the two bytes has been described as the example. However, the embodiment can be applied to image data of one or third bytes or more in the same way. However, when the value of each color element is configured from one byte, there is not a compression effect even though the value is converted into difference information of one byte. Therefore, the compression data of one byte may be generated by mixing the difference value and the value of the repetition number of times.

Figure 11:
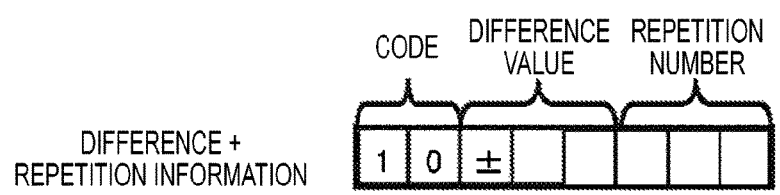
FIG. 11 is a diagram illustrating another configuration example of the compression data reproduced by the image compression device.

For example, as illustrated in FIG. 11, code information "10b" showing difference information is represented in two bits starting from an MSB in compression data of one byte, a difference value (including a sign of ±) is represented in the following three bits, and the repetition number of times is represented in the remaining three bits.

In the example of FIG. 4 described above, when the values of the basic units of Y are represented by the sequence "04h, 05h, 05h, and 05h", in the embodiment, the first encoding process by the difference information conversion unit 13A is applied to the second value and the second value is converted into the difference information "81h". The second encoding process by the repetition number of times conversion unit 13B is applied to the third and fourth values and the third and fourth values are converted into the repetition number of times information "41h". That is, the second to fourth values of the basic units are compressed into the data of the two bytes.

Meanwhile, according to the example of FIG. 11, as a result obtained by applying the encoding processes by the difference information conversion unit 13A and the repetition number of times conversion unit 13B to the second to fourth values, the second to fourth values can be converted into data "89h" ("10001001" when represented by a bit string) of one byte. That is, a value "10b" of two bits starting an MSB in a bit string represented by "89h" is code information showing difference information. A value "001b" of the following three bits shows that a difference value is "+1" and a value "001b" of the remaining three bits shows that the repetition number of times is 2. In this way, the second to fourth values of the basic units can be converted into data of one byte.

In addition, in the embodiment, the first to third encoding processes may be applied after discarding several lower bits of the image data before the compression. In this way, because the frequency of applying any one of the first to third encoding processes can be increased, a compression rate can be increased. This case becomes lossy compression and the original image data cannot be perfectly restored by the image extension device 200. However, because the discarded bits are limited to the several lower bits, this is invisible.

In addition, in the embodiment, the example of the case in which YCbCr is used as a color space of the codec has been described. However, the present invention is not limited thereto. For example, RGB may be used as the color space of the codec.

In addition, the embodiment is only an example used when the present invention is carried out specifically and it should be noted that a technical range of the present invention is not analyzed limitatively by the embodiment. That is, various changes and modifications can be made without departing from the scope of the present invention.

It is therefore intended that the foregoing detailed description be regarded as illustrative rather than limiting, and that it be understood that it is the following claims, including all equivalents, that are intended to define the spirit and scope of this invention.

What is claimed is:

1. An image compression device comprising:
a memory; and
a processor configured to execute instructions stored in the memory and to:
set a basic unit of compression by independently using each of a luminance (Y), a first chroma component (Cb), and a second chroma component (Cr) forming colors of a pixel of image data or by arbitrarily combining Y, Cb, and Cr forming colors of a pixel of image data; and
generate compression data for an image and compress a value of the basic unit according to an encoding process based on a predetermined rule by sequentially executing on image data:
a first encoding process for converting a value of a target pixel regarding the basic unit into difference information with a value of an immediately previous pixel,
a second encoding process for, when a plurality of pixels having values equal to the value of the immediately previous pixel for the basic unit are continuous, converting the values of the plurality of pixels into repetition number of times information,
a third encoding process for, when a combination of values of the basic unit corresponds to a combination previously set as a palette, converting the combination of the values of the basic unit into palette identification information, and
generating compression data obtained by adding code information showing the utilized encoding process.

2. The image compression device according to claim 1, wherein the processor is further configured to:
set a plurality of kinds of basic units;
execute the encoding process under setting of the plurality of kinds of basic units; and
execute a basic unit adoption process to adopt a basic unit when a compression rate becomes highest;
wherein the image data is compressed using the adopted basic unit.

3. The image compression device according to claim 2, wherein the processor is configured to execute the basic unit adoption process for each frame of the image data and to adopt the basic unit when the compression rate becomes highest for each frame.

4. The image compression device according to claim 2, wherein the processor is configured to execute the basic unit adoption process for each line or each block of the image data and to adopt the basic unit when the compression rate becomes highest for each line or each block.

5. The image compression device according to claim 2, wherein the processor is configured to:
execute both a process for executing the basic unit adoption process for each frame of the image data and adopting the basic unit when the compression rate becomes highest for each frame;
execute a process for executing the basic unit adoption process for each line or each block of the image data and adopting the basic unit in which the compression rate becomes highest for each line or each block;
adopt the process in which the compression rate becomes higher; and
compress the image data.

6. A computer implemented image compression method comprising:
setting, with a processor of an image compression device, a basic unit of compression by independently using each of a luminance (Y), a first chroma component (Cb), and a second chroma component (Cr) forming colors of a pixel of image data or by arbitrarily combining Y, Cb, and Cr forming colors of a pixel of image data; and
generating, with the processor of the image compression device, compression data for an image and compressing, with the processor of the image compression device, a value of the set basic unit according to an encoding process based on a predetermined rule by sequentially executing on image data:
a first encoding process for converting a value of a target pixel regarding the basic unit into difference information with a value of an immediately previous pixel,
a second encoding process for, when a plurality of pixels having values equal to the value of the immediately previous pixel for the basic unit are continuous, converting the values of the plurality of pixels into repetition number of times information,
a third encoding process for, when a combination of values of the basic unit corresponds to a combination previously set as a palette, converting the combination of the values of the basic unit into palette identification information, and generating compression data obtained by adding code information showing the utilized encoding processes.

7. The image compression method according to claim 6, wherein the processor sets a plurality of kinds of basic units and executes the encoding process under setting of the plurality of kinds of basic units, a basic unit when a compression rate becomes highest is adopted, and the image data is compressed.

8. An image extension device comprising:
a memory; and
a processor configured to execute instructions stored in the memory and to:
   execute an inverse process of the encoding process based on the predetermined rule on the compression data generated by the image compression device according to claim 1, thereby decoding the value of the basic unit; and
   reproduce values of the pixels configured from the plurality of color elements, using the value of the basic unit decoded by the decoding process unit.

9. A computer implemented image extension method comprising:
   executing, with the processor of an image extension device, an inverse process of the encoding process based on the predetermined rule on the compression data generated by the image compression method according to claim 6, thereby decoding the value of the basic unit; and
   reproducing, with the processor of the image extension device, values of the pixels configured from the plurality of color elements, using the decoded value of the basic unit.

10. The image compression device of claim 1, where the processor sets the basic unit of compression by arbitrarily combining Y, Cb, and Cr forming colors of a pixel of image data.

11. The computer implemented image compress method of claim 6, where the basic unit of compression is set by arbitrarily combining Y, Cb, and Cr forming colors of a pixel of image data.

* * * * *